United States Patent [19]

Wentz

[11] 4,042,302
[45] Aug. 16, 1977

[54] BROADBAND WAVELENGTH DISCRIMINATOR

[75] Inventor: John L. Wentz, Ellicott City, Md.

[73] Assignee: Westinghouse Electric Corporation, Pittsburgh, Pa.

[21] Appl. No.: 665,463

[22] Filed: Mar. 10, 1976

[51] Int. Cl.² .............................................. G01J 3/00
[52] U.S. Cl. ....................................... 356/74; 356/114
[58] Field of Search ....................... 356/74, 88, 96, 98, 356/114; 250/225; 350/147, 157, 158

[56] References Cited

U.S. PATENT DOCUMENTS 2,742,818  4/1956  Hurlbut, Jr. ...................... 356/114 X
3,927,945  12/1975  Bates .................................. 356/114 X Primary Examiner—F. L. Evans
Attorney, Agent, or Firm—R. M. Trepp

[57] ABSTRACT

A broadband optical discriminator for determining the wavelength of received radiation which is in a narrow band is described. The received radiation is passed through a polarization spoiler, a linear polarizer, a polarization dispersion device, and a beam splitting polarizer forming two beams. The intensity of the two beams is converted into electrical signals. The electrical signals are processed to provide a signal indicative of the wavelength of the incident radiation.

10 Claims, 4 Drawing Figures

BROADBAND WAVELENGTH DISCRIMINATOR

BACKGROUND OF THE INVENTION

1. Field of the Invention

This invention relates to an electro-optical measuring instruments, particularly to spectrometers.

2. Description of the Prior Art

In the prior art, a broadband wavelength discriminator has been built by submitting radiation of unknown wavelength to the inputs of a parallel arrangement of filters wherein each filter has a narrow bandwidth. The output of each filter is optically coupled to a detector, which provides a signal indicative of incident radiation within its narrow bandwidth. The bandwidths of each filter are adjusted such that a continuous range of wavelengths is monitored by the filters. Consequently, a narrow bandwidth optical signal will pass through one of the narrow bandwidth filters and the detector will provide a signal indicative of the bandwidth of the incident radiation. Another means of providing a broadband wavelength discriminator is provided by using the dispersive characteristics of a refracting medium, such as may be provided by a glass prism. A linear array of detectors are positioned with respect to the prism to receive the dispersed radiation and to provide a signal indicative of its wavelength.

SUMMARY OF THE INVENTION

In accordance with the present invention, a method and apparatus is described for determining the wavelength of incident narrow band radiation by randomizing the polarization of incident radiation, passing a portion of the randomized incident radiation through a linear polarizer, a polarization dispersion device in a direction parallel to its optic axis and a beam splitting polarizer forming a first and second output beam. The first and second output beam intensity is detected to provide a first and second signal respectively, which is processed to provide a third signal indicative of the wavelength of the incident radiation.

DESCRIPTION OF THE PREFERRED EMBODIMENTS

Figure 1:
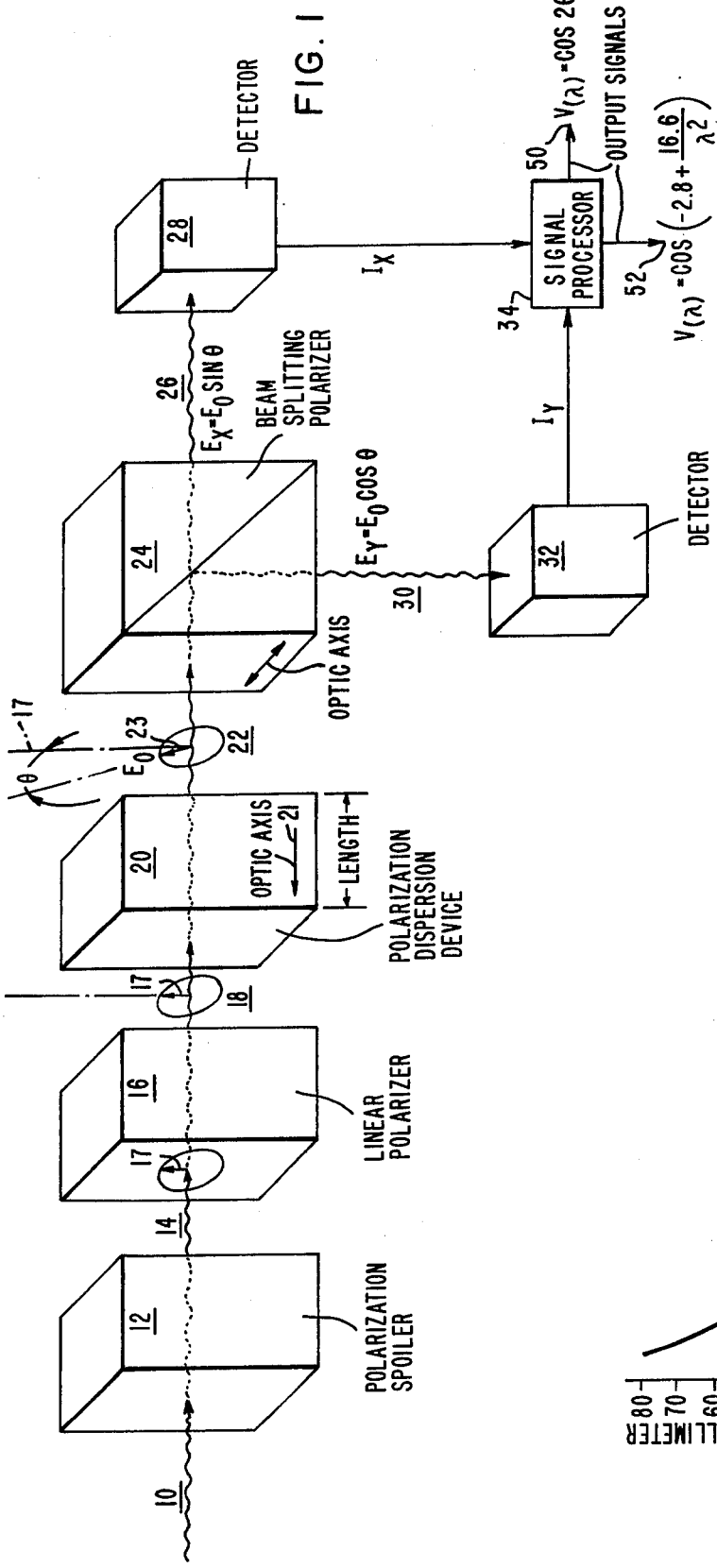
FIG. 1 is a block diagram of one embodiment of the invention.
Figure 2:
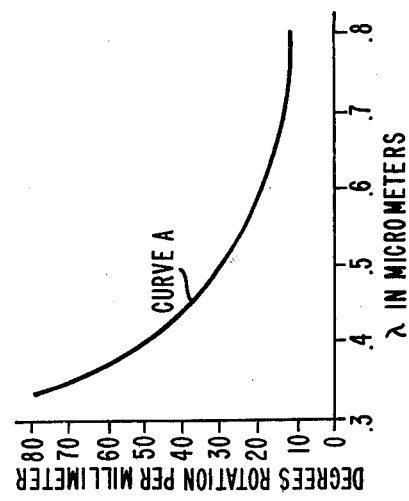
FIG. 2 shows a graph respresenting the rotatory dispersion in crystalline quartz.
Figure 3:
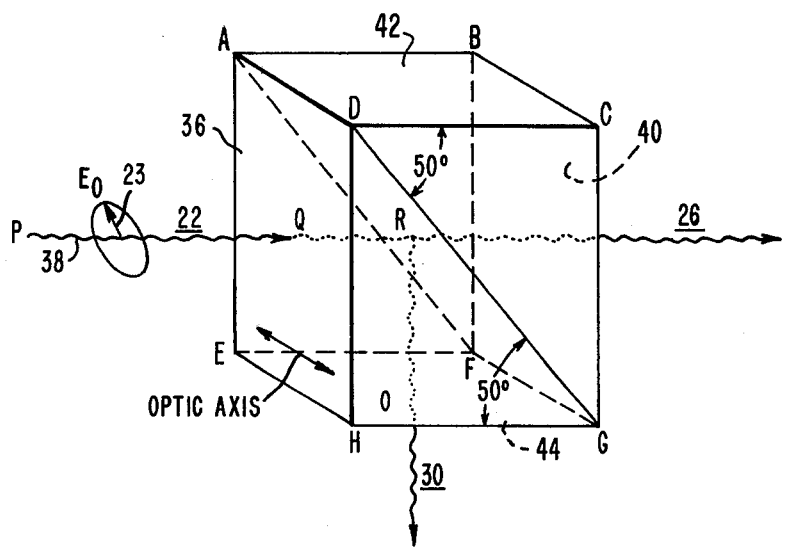
FIG. 3 shows one method of constructing a beam splitting polarizer.

Referring to FIG. 1, incident radiation 10 of unknown wavelength passes through polarization spoiler or randomizer 12. The sole function of randomizer 12 is to provide a polarization component parallel to the axis of linear polarizer 16. Randomizer 12, for example, may be constructed of a fiber optic array or of an isotropic material with random birefringence distribution which would essentially randomize the polarization of the incident radiation 10. A portion of the randomized incident radiation 14 passes through linear polarizer 16. One example of a linear polarizer is a dichroic polarizer such as manufactured by Eastman Kodak Company, which is commercially available. Another example of a linear polarizer would be any of the types employing calcite crystals such as Glan, Glan-Thompson, or Nicol polarizers. Linear polarizer 16 is positioned or optically coupled to randomizer 12 so that a portion of radiation 14 from randomizer 12 will enter linear polarizer 16. The orientation of the polarization of radiation 14 has been spoiled or randomized to provide a component or E field of the polarized wave in the direction 17 which corresponds to the direction of the linear polarization of the linear polarizer 16. The output of linear polarizer 16 is radiation 18 which is polarized in the direction 17 and is optically coupled to polarization dispersion device 20. Polarization dispersion device 20 may be constructed of crystalline quartz which exhibits rotatory dispersion of a polarized light beam as a function of wavelength. The rotatory dispersion of quartz for visible radiation is shown in FIG. 2. In FIG. 2, the ordinate represents the angle of rotation of a linearly polarized beam per unit length of crystalline quartz through which light passes. The abscissa represents the wavelength of the linearly polarized beam or radiation 18. Rotatory dispersion device 20 has a Z or optic axis 21 which is oriented parallel to the incoming radiation 18. The polarization axis of the emerging radiation 22 from rotatory dispersion device 20 is rotated with respect to the polarization axis of radiation 18 incident upon the rotatory dispersion device 20 as a function of wavelength in accordance with FIG. 2 for the wavelengths shown. As shown in FIG. 2, the longer wavelengths are rotated less than the shorter wavelengths. The acceptance angle of the incoming radiation 18 with respect to optic axis 21 is on the order of 1 milliradian for crystalline quartz in order to achieve proper rotatory dispersion of the radiation 18. An alternative to a rotatory dispersion device which allows greater acceptance angles, greater than 1°, would be a retardation waveplate. The acceptance angle is the angle between the direction of travel of radiation 18 and the direction of the optic axis 21. An example of a retardation waveplate would be a crystalline quartz waveplate. Radiation 22 having a polarization axis 23 represents the output of rotatory dispersion device 20 and is optically coupled to beam splitting polarizer 24. Beam splitting polarizer 24 resolves the polarization emerging from rotatory dispersion device 20 which is in the direction of polarization axis 23 into two orthogonal components. One example of a beam splitting polarizer may be a Glan prism, as shown in FIG. 3. The beam splitting polarizer 24 has a first output beam 26 which is optically coupled to detector 28 and a second output beam 30 which is optically coupled to detector 32. The first and second output beams 26 and 30 represent the orthogonal polarization components of radiation 22, having a polarization axis 23. Output beam 26 represents one orthogonal component with amplitude $E_x$ which equals $E_o \sin \theta$. Output beam 30 represents $E_y$ which equals $E_o \cos \theta$. Radiation 22 has an E field amplitude of $E_o$. The angle $\theta$ represents the angle between the polarization axis 23 and the optic axis of the beam splitting polarizer 24. Detectors 28 and 32 may be constructed of germanium which is also known as a square law detector and would have an electrical signal output indicative of the E field squared or $E_x^2$ and $E_y^2$ respectively of the radiation, which corresponds to the intensity of the radiation of the output beams 26 and 30. Detectors 28 and 32 may also be constructed of silicon which also exhibits a square law characteristic. The electrical output of detector 28 is connected to an input of signal processor 34 and an electrical output of detector 32 is connected to an input of signal processor 34.

Signal processor 34 combines the outputs of detectors 28 and 32 to provide an output signal indicative of the rotation of the polarization axis 23 with respect to the polarization axis or E field direction 17 angle $\theta$. Processor 34 may also provide an output signal indicative of the wavelengths of the incident radiation 10 if the characteristic of the rotatory dispersion device 20 is known. For example, curve A in FIG. 2 may be represented by the equation (1):

$$\theta = -1.4 + (8.3/\lambda 2) \tag{1}$$

One example of a beam splitting polarizer 24 is a Glan prism which was published by Glan in 1880 and is shown in FIG. 3. Referring to FIG. 3, the Glan prism is made of Iceland spar (calcite) with each face of the prism rectangular. Radiation 22 having a polarization axis 23 enters into face 36 as may be represented by ray PQ or ray 38. End face 36 has opposite edges AD and EH and end face 40 located opposite end face 36 has opposite edges BC and FG which are parallel to each other and parallel to the optic axis of the prism material. The prism is cut along the plane ADGF, which makes an angle of about 50° with the lateral faces 42 and 44. The two halves of the prism formed by the cut are separated by a film of air. The ray PQ or 38, incident normally on end face 36, is propagated along QR undeviated, the X and Y components of the E field of the ray 38, travel in the same direction but have unequal velocities. The Y component of the E field of the ray is totally reflected at the air film along the direction RO and corresponds to output beam 30, while the X component of the E field of the ray 38 is transmitted undeviated along RE and corresponds to output beam 26 of FIG. 1. The direction of vibration of the emergent ray RO is orthogonal to the optic axis while ray RE parallel to the optic axis.

Figure 4:
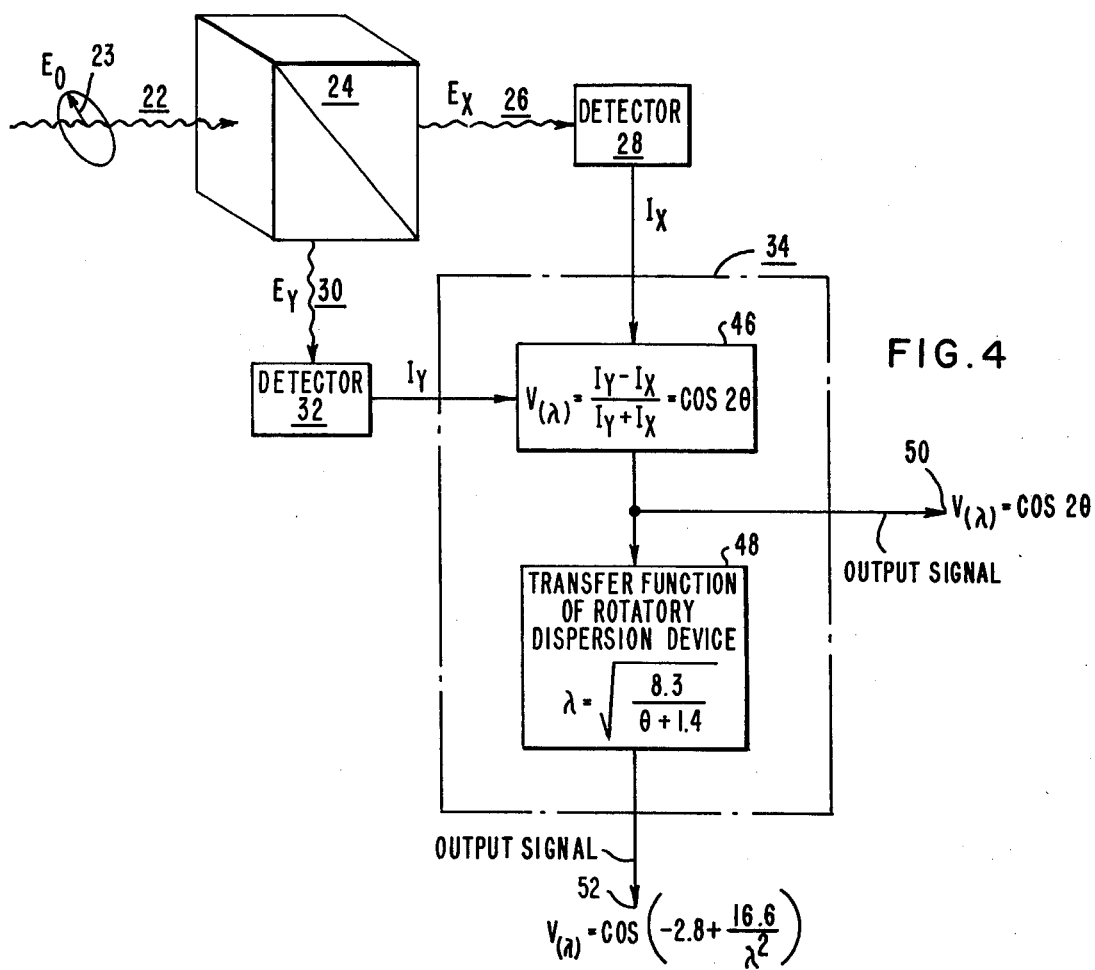
FIG. 4 shows one method of processing the output of the detectors.

Referring now to FIG. 4, if detectors 28 and 32 are square law detectors, then the output currents $I_x$ and $I_y$ are expressed in Equations (2) and (3), respectively:

$$I_x = KE_o^2 \cos^2\theta = \frac{KE^2_o}{2} (1 + \cos 2\theta) \tag{2}$$

$$I_y = KE_o^2 \sin^2\theta = \frac{KE^2_o}{2} (1 - \cos 2\theta) \tag{3}$$

where $K$ is a proportionality constant. Signal processor 34 combines $I_x$ and $I_y$ to eliminate the dependence on $KE_o^2/2$ and provides an output signal given by Equation (4), which is also shown in Equation box 46 of FIG. 4.

$$V(\lambda) = \frac{I_y - I_x}{I_y + I_x} = \cos 2\theta \tag{4}$$

Equation box 46 may be implemented with analog or digital circuitry to provide a voltage as a function of the cosine of $2\theta$. By substituting Equation (1) which is representative of curve A in FIG. 2 for $\theta$ in Equation (4), Equation (5) may be derived, as shown in Equation box 48:

$$V(\lambda) = \cos(-2.8 + (16.6/\lambda 2)) \tag{5}$$

The output of Equation box 46 is connected to terminal 50 which provides a voltage indicative of the cosine of $2\theta$. Equation box 48 may utilize other equations other than Equation (1) which may represent the transfer function of a rotatory dispersion device 20 indicating angular rotation as a function of wavelength. With an input from Equation box 46 terminal 50 to Equation box 48, the equation representing the transfer function of device 20 may be solved in Equation box 48, using either analog or digital circuitry to provide an output signal which is connected to terminal 52 indicative of the wavelength of radiation 10.

In operation, radiation 10, having an unknown wavelength is measured in the embodiment as shown in FIG. 1. Radiation 10 may have been subject to some preliminary wavelength filtering to provide a sample of radiation to the device which is in a single, narrow band of radiation. The radiation 10 may be monochromatic such as obtained from a laser or from various electronically excited gases, such as sodium or mercury. Radiation 10 may have a random polarization to begin with or may be linearly polarized in a single direction. Polarization randomizer 12 homogenizes the polarization components to assure that radiation 10 has its polarization axis mixed in all directions as represented by radiation 14 such that one polarization component would be aligned with polarization axis 17 which would allow it to pass through linear polarizer 16 whereupon the radiation 18 is linearly polarized in the direction of polarization axis 17. The radiation 18 of unknown wavelength passes through rotatory dispersion device 20 which will rotate the polarization axis of radiation 18 through an angle $\theta$ orthogonal or transverse to the optic axis, either to the left or to the right. Radiation 22 having a polarization axis 23 which was rotated through an angle $\theta$ enters beam splitting polarizer 24 having an output beam 26 and 30 representing orthogonal components of the electric field $E_x$ and $E_y$, respectively of the radiation. The detectors 28 and 32 operate to supply a current $I_x$ and $I_y$ respectively to signal processor 34. Signal processor 34 first solves Equation (4) to provide a signal indicative of the rotation of the polarization axis and secondly solves Equation (5) or (6) to provide a signal indicative of the wavelength.

$$\lambda = \sqrt{(8.3/\theta + 1.4)} \tag{6}$$

Assuming that the solution of Equation (4) $V(\lambda)$ can be measured to one part in one hundred, the incremental wavelength change which can be resolved would not exceed approximately 50A for wavelengths less than 1 micrometer and a quartz rotatory dispersion device thickness of less than 1 millimeter. The incremental change in $V(\lambda)$ for a given change in $\lambda$ is obtained by differentiating Equation (5).

$$\Delta\lambda = \frac{\Delta V \lambda^3}{33.2 \sin(-2.8 + \frac{16.6}{\lambda 2})} \tag{7}$$

Optical alignment errors, scattering, and electrical noise may cause $\Delta \lambda$ to exceed 50 A; however, even if $\Delta \lambda$ is as large as 500 A, the discriminator performance would not be adversely affected for wavelength measurement in some applications.

An alternate to the rotatory dispersion device 20 may be a retardation wave plate. This type of wave plate would convert an incident linearly polarized beam into an elliptically polaraized beam with wavelength dependent eccentricity. Measurement of the eccentricity by comparing the relative amplitudes of the two orthogonal polarization components exiting from the beam splitting polarizer 24 will provide a measure of wavelength. Materials for the wave plate are available with transmission bands extending from 0.3 to 30 micrometers, and when used with suitable IR detectors, can provide wavelength discrimination in the near and far infrared bands.

The invention provides a method and apparatus for determining the wavelengths of incident narrow band radiation by passing a portion of the radiation which has been linearly polarized through a rotary dispersion device and beam splitting polarizer which would form a first and second beam representative of the orthogonal components of the polarized radiation which has been rotated through an angle $\theta$. For example, quartz will provide rotatory dispersion for wavelengths extending from 0.2 micrometers to 3 micrometers. The first and second output beam amplitudes are detected to provide a first and second signal respectively which are processed to provide a third signal indicative of the wavelength of the incident radiation.

I claim:

1. A method for determining the wavelength of incident narrow band radiation comprising the steps of:
   randomizing the orientation of the polarization of incident radiation and passing a portion of said randomized incident radiation through a linear polarizer;
   passing said incident radiation from said linear polarizer through and in the direction of the optic axis of a polarization dispersion device;
   forming a first and second output beam by passing a portion of said incident radiation after it exits from said polarization dispersion device through a beam splitting polarizer;
   detecting said first and second output beam to provide a first and second signal respectively indicative of the intensity of said first and second output beam; and
   processing said first and second signals to provide a third signal indicative of the wavelength of said incident radiation.

2. The method of claim 1 wherein said step of processing said first and second signals includes the step of solving the equation $V(\lambda) = (I_y - I_x)/(I_y + I_x)$ where $I_y$ and $I_x$ are representative of said first and second signals respectively.

3. The method of claim 1 wherein said step of processing said first and second signals includes the step of processing said first and second signals to provide a fourth signal indicative of the rotation of the polarization axis of said incident radiation from said linear polarizer by passing said incident radiation through said polarization dispersion device.

4. The method of claim 3 wherein said step of processing said first and second signals includes the step of processing said fourth signal in accordance with the dispersion characteristics of said polarization dispersion device to provide said third signal.

5. Apparatus for determining the wavelength of incident narrow band radiation comprising:
   means for randomizing the orientation of the polarization of incident radiation;
   a linear polarizer for passing a portion of said randomized incident radiation through said linear polarizer;
   a polarization dispersion device coupled to receive radiation from said linear polarizer in the direction of the optic axis of said polarization dispersion device;
   a beam splitting polarizer to form a first and second output beam coupled to receive radiation from said polarization dispersion device;
   means for detecting said first and second output beam to provide a first and second signal respectively indicative of the intensity of said first and second output beam; and
   means for processing said first and second signals to provide a third signal indicative of the wavelength of said incident radiation.

6. The apparatus of claim 5 wherein said polarization dispersion device includes a rotatory dispersion device.

7. The apparatus of claim 5 wherein said polarization dispersion device includes a retardation waveplate.

8. The apparatus of claim 7 wherein said beam splitting polarizer forms said first and second output beams which are orthogonal polarization components of the received radiation.

9. The apparatus of claim 5 wherein said means for detecting said first and second output beams includes a silicon detector.

10. The apparatus of claim 5 wherein said means for processing said first and second signals includes means for determining the rotation of the polarization of the radiation passing through said polarization dispersion device.

* * * * *